(12) United States Patent
Ogasawara et al.

(10) Patent No.: US 8,596,621 B2
(45) Date of Patent: Dec. 3, 2013

(54) LIQUID-SEALED TYPE VIBRATION ISOLATOR (75) Inventors: Dai Ogasawara, Osaka (JP); Shingo Hatakeyama, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 294 days.

(21) Appl. No.: 13/120,106

(22) PCT Filed: Mar. 5, 2009

(86) PCT No.: PCT/JP2009/001004
§ 371 (c)(1),
(2), (4) Date: Apr. 28, 2011

(87) PCT Pub. No.: WO2010/035365
PCT Pub. Date: Apr. 1, 2010

(65) Prior Publication Data
US 2011/0193276 A1 Aug. 11, 2011

(30) Foreign Application Priority Data
Sep. 29, 2008 (JP) ................................. 2008-250494

(51) Int. Cl.
*F16F 5/00* (2006.01)

(52) U.S. Cl.
USPC ................................... 267/140.13; 267/140.4

(58) Field of Classification Search
USPC ................. 267/140.11–140.13, 140.3–140.5, 267/141–141.7, 219
See application file for complete search history.

(56) References Cited

U.S. PATENT DOCUMENTS

| 2005/0200060 A1 | 9/2005 | Hiraoka |
| 2009/0224445 A1 | 9/2009 | Hatakeyama et al. |

FOREIGN PATENT DOCUMENTS

| JP | 2006-207672 A | | 8/2006 |
| JP | 2006-258153 A | | 9/2006 |
| JP | 2006-342834 A | | 12/2006 |
| JP | 2007-154904 A | | 6/2007 |
| JP | 2007-162952 A | | 6/2007 |
| JP | 2007-211971 A | | 8/2007 |
| JP | 2007-211972 A | | 8/2007 |
| JP | 2007-218416 A | | 8/2007 |
| JP | 2007218416 A | * | 8/2007 |
| JP | 2007-271004 A | | 10/2007 |
| JP | 2008-164102 A | | 7/2008 |

OTHER PUBLICATIONS

International Search Report of PCT/JP20009/001004, date of mailing Jun. 2, 2009.
Japanese Office Action dated Apr. 19, 2011, issued in corresponding Japanese Patent Application No. 2008-250488.

* cited by examiner

*Primary Examiner* — Melanie Torres Williams
(74) *Attorney, Agent, or Firm* — Westerman, Hattori, Daniels & Adrian, LLP (57) ABSTRACT A partitioning member partitioning two liquid chambers includes an orifice forming member, an elastic wall configured to close an inner peripheral surface thereof, and a pair of partitioning plates which hold the elastic wall from both sides in an axial direction X The pair of partitioning plates includes a holding portion configured to hold the elastic wall radially outward Ko of a coupling portion. The holding portion comprises a first holding portion on the radially outside and a second holding portion on the radially inside, and the first holding portion is provided with a high-compression holding portion having a compression ratio higher than that of the second holding portion. Accordingly, the abnormal sound is reduced while achieving both the damping performance in the low frequency range and the lowering of the dynamic spring constant in the high-frequency range without impairing the assembleability of the partitioning member.

9 Claims, 8 Drawing Sheets

LIQUID-SEALED TYPE VIBRATION ISOLATOR

TECHNICAL FIELD

The present invention relates to a liquid-sealed type vibration isolator.

BACKGROUND ART

In the related art, as described in the following Patent Document 1, a liquid-sealed type vibration isolator including a first fixture, a cylindrical second fixture, a vibration-isolating base member formed of a rubbery elastic material for coupling the first fixture and the second fixture, a diaphragm formed of a rubber membrane which is mounted to the second fixture and defines a liquid-sealed chamber between the vibration-isolating base member and itself, a partitioning member configured to partition the liquid-sealed chamber into a first liquid chamber on the side of the vibration-isolating base member and a second liquid chamber on the side of the diaphragm, and an orifice configured to communicate the first liquid chamber and the second liquid chamber. In the liquid-sealed type vibration isolator, the partitioning member is configured with an elastic partitioning membrane, an annular orifice forming member configured to accommodate the elastic partitioning membrane, and a first lattice portion and a second lattice portion configured to restrict the amount of displacement of the membrane surface of the elastic partitioning membrane from both sides.

In the liquid-sealed type vibration isolator, when low-frequency vibrations having large amplitude occur, liquid circulates between the first liquid chamber and the second liquid chamber through the orifice, and damps the vibrations by the liquid flow effect. When high-frequency vibrations having minute amplitude occur, the elastic partitioning membrane are deformed in a reciprocating motion, so that the liquid pressure in the first liquid chamber is absorbed to reduce the vibrations. According to the structure in the related art, there is a problem such that an impact caused by a collision of the elastic partitioning membrane against the first lattice portion and the second lattice portion is transmitted to the second fixture via the orifice forming member formed of a stiff member, and then from the second fixture to the vehicle body side, thereby generating an abnormal sound in a cabin.

In contrast, in the following Patent Document 2 and Patent Document 3, for the purpose of preventing the abnormal sound caused by an impact from being transmitted to the cabin without loss of the vibration-isolating characteristics, the configuration of the partitioning member that partitions the first liquid chamber and the second liquid chamber as follows. In other words, the partitioning member includes the annular orifice forming member, a rubber wall configured to close an inner peripheral surface of the orifice forming member, a pair of partitioning plates connected to each other via a coupling portion which penetrates through the rubber wall and hold the rubber wall therebetween in the axial direction so that the amount of displacement of the pair of partitioning plates in the axial direction is restricted by the rubber wall.
Patent Document 1: JP-A-2006-342834
Patent Document 2: JP-A-2006-207672
Patent Document 3: JP-A-2007-211971

DISCLOSURE OF INVENTION

Problems to be Solved by the Invention

In the configuration disclosed in Patent Documents 2 and 3, since the amount of displacement of the pair of partitioning plates is restricted by the rubber wall, vibrations may be reduced by lowering a dynamic spring constant by a reciprocating motion of the partitioning plates with respect to minute amplitude vibrations in a high-frequency range while damping the vibrations by the liquid flow effect of the orifice with respect to a large amplitude vibrations in a low-frequency range. In addition, since the partitioning plates are supported by the rubber wall, transmission of the abnormal sound into the cabin is restrained.

However, there is higher demand of reduction of abnormal sound, and the configurations disclosed in Patent Documents 2 and 3 cannot respond such demand.

In other words, with the configurations disclosed in these documents, the pair of partitioning plates include holding portions configured to hold the rubber wall therebetween from both sides in the axial direction on the radially outward of the coupling portion, and are opposed to each other with a gap formed with respect to the rubber wall along an outer peripheral edge portion positioned on the radially outward. Then, in the above described holding portions, the compression ratio of the rubber wall in the axial direction is substantially constant in the radial direction and, strictly speaking, the compression ratio is set to be gradually reduced as it goes radially outward toward a portion where the gap is formed.

With such settings, when the partitioning plates are significantly displaced in the axial direction due to a change of liquid pressure, for example, when it is displaced excessively upward, the holding portion of the upper partitioning plate comes apart from the rubber wall from the side of the outer peripheral edge. Therefore when being displaced downward subsequently, the upper partitioning plate collides with the rubber wall and causes the abnormal sound. When the compression ratio of the rubber wall in the axial direction caused by the holding portion is increased entirely in the radial direction in order to prevent the abnormal sound as described above, the partitioning plate is prevented from coming apart from the rubber wall. However, since the rubber wall is hardened due to the compression, the partitioning plates can hardly make reciprocating motion with respect to the high-frequency vibration, so that the effect of lowering of the dynamic spring constant is impaired. If the compression ratio of the rubber wall is set to be high entirely in the radial direction, there arises a problem of impairment of the assembleability of the partitioning plates such that when integrating the pair of the partitioning plates with the coupling portion at the center in a state of holding the rubber wall therebetween at the time of assembly of the partitioning members, defective fixing may occur at the coupling portion due to a reaction force of rubber with high compression ratio.

In view of such points described above, it is an object of the present invention to provide a liquid-sealed type vibration isolator which can reduce an abnormal sound while achieving both the damping performance in the low-frequency range and lowering of the dynamic spring constant in the high-frequency range, and without impairing the assembleability of the partitioning member.

Means for Solving the Problems

A liquid-sealed type vibration isolator according to the present invention includes a first fixture, a cylindrical second fixture, a vibration-isolating base member formed of a rubbery elastic material for coupling the first fixture and the second fixture, a diaphragm formed of a rubbery elastic membrane which is mounted to the second fixture and defines a liquid-sealed chamber between the vibration-isolating base member and itself, a partitioning member configured to partition the liquid-sealed chamber into a first liquid chamber on the side of the vibration-isolating base member and a second liquid chamber on the side of the diaphragm, and an orifice configured to communicate the first liquid chamber and the second liquid chamber. The partitioning member includes: an annular orifice forming member provided inside a peripheral wall portion of the second fixture and forming the orifice; an elastic wall formed of the rubbery elastic material which closes the inner peripheral surface of the orifice forming member; and a pair of partitioning plates connected to each other via a coupling portion penetrating through the radially center portion of the elastic wall and holding the elastic wall therebetween in the axial direction of the elastic wall. The pair of partitioning plates each include a holding portion which holds the elastic wall radially outward of the coupling portion, the holding portion comprises a first holding portion provided radially outward and a second holding portion provided radially inward, and the first holding portion is provided with a high compression holding portion configured to hold the elastic wall at a compression ratio in the axial direction higher than the second holding portion.

In general, the pair of partitioning plates coupled to each other via the coupling portion at the center moves away from the elastic wall from the outer peripheral edge side with respect to the displacement in the axial direction. In contrast, with the configuration as described above, the high compression holding portion having a high compression coefficient in the axial direction is provided radially outward in the holding portion of the partitioning plate. In this manner, since the high compression holding portion is provided on the outer peripheral side which corresponds to the starting point of the movement away from the elastic wall, the amount of displacement of the partitioning plate until the partitioning plate starts to move away from the elastic wall in the axial direction can be set to a large amount, so that the contact state of the partitioning plate with respect to the elastic wall can be maintained. Therefore, the abnormal sound caused by the movement of the partitioning wall away from the elastic wall can be reduced.

In the configuration as described above, the high compression holding portions are provided radially outward of the holding portions of the partitioning plates, and the compression ratio is not enhanced entirely in the radial direction. Therefore, easiness of the reciprocating motion of the partitioning plates with respect to the high-frequency vibrations can be secured while restraining increase of stiffness of the entire elastic wall, so that the effect of lowering the dynamic spring constant can be maintained. Also, at the time of assembly of the partitioning member, the defective securing at the coupling portion due to the reaction force of the elastic wall can be avoided, so that a good assembleability of the partitioning member can be maintained.

In the configuration as described above, preferably, the elastic wall is provided with a plurality of depressions in the circumferential direction on at least one of front and back wall surfaces of the elastic wall in an elastic wall portion to be held between the high compression holding portions, thereby having thin low-stiffness portions discontinuously in the circumferential direction in the elastic wall portion.

With the provision of the thin low-stiffness portions discontinuously in the circumference direction of the elastic wall, reciprocating movement of the partitioning plates in the axial direction with respect to the minute amplitude vibrations in the high-frequency range is facilitated, so that the dynamic spring constant can be lowered. While the high compression holding portion is a portion to enhance the compression ratio in the axial direction so as to minimize the movement of the partitioning plate away from the elastic wall even at the large amount of displacement in the axial direction, if the compression ratio is enhanced, the elastic wall becomes hard correspondingly. Therefore, with the provision of the low-stiffness portions formed of the depressions discontinuously on the high-compression holding portion, the compression ratio in the axial direction can be enhanced so as to avoid the movement of the partitioning plates away from the elastic wall without hardening the portion of the elastic wall held between the first holding portions located radially outward or, preferably, maintaining the corresponding portion to be soft. In this case, the abutment of the partitioning plate and the elastic wall in the high-compression holding portion is achieved in the circumferential portion between the discontinuously provided low-stiffness portions (depressions).

The depressions which constitute the low-stiffness portions are preferably provided on only one of the front and back wall surfaces of the elastic wall. With the provision of the depressions on one of the wall surfaces of the elastic wall, the holding portion of the partitioning plate can be brought into abutment entirely with the other wall surface, so that the abnormal sound can hardly be generated.

In the configuration as described above, preferably, the wall surfaces of the elastic wall opposing the first holding portions of the pair of partitioning plates and the portions radially outward of the first holding portions of the partitioning plates are formed into an inclined surface positioned axially outward as it goes radially outward, so that the outer peripheral portion of the elastic wall is formed to be thick. In this manner, by forming the outer peripheral portions of the elastic wall to be thick, the displacement in the reciprocating motion of the partitioning plates can be restrained effectively at the time of the large amplitude vibrations in the low-frequency range.

In this configuration, preferably, the elastic wall fixedly bonded to the inner peripheral surface of the orifice forming member is provided on the outer peripheral portion thereof with a swelling portion configured to enhance the stiffness of the outer peripheral portion of the elastic wall by swelling axially outward with respect to the inclined wall surface. With the provision of the swelling portion as described above, the displacement restriction effect of the partitioning plates at the time of the large amplitude vibrations can be enhanced further by enhancing the stiffness of the outer peripheral portion of the elastic wall.

In this configuration, preferably, the orifice forming member to which the outer peripheral portion of the elastic wall is fixedly bonded is provided on the inner peripheral surface thereof with a projection configured to enhance the stiffness of the outer peripheral portion of the elastic wall by projecting radially inward. With the provision of the projection as described above, the displacement restriction effect of the partitioning plates at the time of the large amplitude vibrations can be enhanced further by enhancing the stiffness of the outer peripheral portion of the elastic wall.

In the configuration as described above, preferably, the outer peripheral portion of the elastic wall fixedly bonded to the inner peripheral surface of the orifice forming member is formed with the swelling portion swelling toward the first liquid chamber from a wall surface of the elastic wall on the side of the first liquid chamber with respect to the inclined wall surface, and the distal end of the swelling portion is positioned on the side of the first liquid chamber with respect to the end of the orifice forming member on the side of the first liquid chamber. Also, preferably, the inner peripheral surface of the orifice forming member to which the outer peripheral portion of the elastic wall is fixedly bonded is formed with the projection projecting radially inward at a root portion of the elastic wall on the side of the second liquid chamber, the side surface of the projection on the side of the second liquid chamber is formed into a flat surface perpendicular to the axial direction of the elastic wall, and the side surface of the projection on the side of the second liquid chamber is used as a pressing surface in the axial direction with respect to a molding die at the time of molding the elastic wall.

With the provision of the swelling portion and the projection as described above, the displacement restriction effect of the partitioning plates at the time of the large amplitude vibrations can be enhanced further by enhancing the stiffness of the outer peripheral portion of the elastic wall. On the side of the first liquid chamber of the partitioning member, the swelling portion is provided on the elastic wall as a measure to enhance the stiffness, and the swelling portion is formed of a rubbery elastic material, even when the vibration-isolating base member is excessively displaced and collides with the swelling portion, damage of the vibration-isolating base member can be prevented. On the side of the second liquid chamber of the partitioning member, the projection is provided on the inner peripheral surface of the orifice forming member as a measure for enhancing the stiffness, and the side surface of the projection on the side of the second liquid chamber is formed into a flat shape orthogonal to the axial direction. Therefore, the molding die can be pressed against the side surface of the projection to seal the rubbery elastic material so as not to leak from the inside the cavity at the time of molding the elastic wall, so that the generation of the burr can be restrained.

In this configuration, preferably, the coupling portion includes a first flat portion provided on one of the partitioning plates so as to extend perpendicularly to the axial direction, a fitting projection projecting axially from the first flat portion, a fitting depression provided on the other partitioning plate so as to allow fitting of the fitting projection, and a second flat portion provided on an opening edge portion of the fitting depression so as to extend perpendicularly to the axial direction, the outer peripheral surface of the fitting projection is provided with a first welding portion apart from the first flat portion in the axial direction and the inner peripheral surface of the fitting depression is provided with a second welding portion apart from the second flat portion in the axial direction, and the fitting projection and the fitting depression are fixedly fitted by welding between the first welding portion and the second welding portion in a state in which the first flat portion and the second flat portion are in contact with each other.

In this manner, since the first flat portion and the second flat portion are provided separately from the welding portion including the first welding portion and the second welding portion between the fitting projection and the fitting depression to cause the same to come into contact with each other as a positioning portion, the positioning of the pair of partitioning plates in the axial direction is achieved, and the positional displacement in parallelism is also restrained. Also, by setting the positioning portion and the welding portion apart from each other in the axial direction, that is, separately from each other, the chippings of the material melted by the welding are prevented from advancing to the positioning portion. Therefore, the positional displacement in the axial direction and in parallelism which may occur when fixedly coupling the pair of partitioning plates can be restrained and, simultaneously, the both member can be fixedly coupled with reliability, so that fluctuations in vibration insulating performance can be restrained.

In the configuration as described above, it is also applicable that the first welding portion and the second welding portion are formed into tapered surfaces fitted to each other, and the first welding portion and the second welding portion are welded in a state in which the fitting projection and the fitting depression are positioned coaxially by the abutment between the tapered surfaces. By forming the contact surfaces to which the fitting projection and the fitting depression are welded into tapered surfaces, the positioning displacement in coaxiality can also be prevented.

In the configuration described above, preferably, the elastic wall includes a through hole which allows penetration of the coupling portion, the coupling portion includes a first coupling portion provided on one of the partitioning plates and configured to be inserted into the through hole from one side in the axial direction and a second coupling portion provided on the other partitioning plate and configured to be inserted into the through hole from the other side in the axial direction, and the first coupling portion is provided with the first flat portion and the fitting projection, the second coupling portion is provided with the second flat portion and the fitting depression, and the fitting projection and the fitting depression are fixedly fitted in a state in which the first flat portion and the second flat portion are in contact with each other at a center of the through hole in the axial direction. In this configuration, the first and second flat portions and the fitting projection and the fitting depression can be disposed adequately, and a good workability in assembly of the partitioning members is achieved.

Advantages of the Invention

According to the present invention, the abnormal sound can be reduced while maintaining the effect of lowering the dynamic spring constant in the high-frequency range and without impairing the assembleability of the partitioning member.

REFERENCE NUMERALS

10 . . . liquid-sealed type vibration isolator, 12 . . . first fixture, 14 . . . second fixture, 14A . . . peripheral wall portion, 16 ... vibration-isolating base member, 36 ... liquid-sealed chamber, 36A ... first liquid chamber, 36B ... second liquid chamber, 38 ... diaphragm, 40 ... partitioning member, 42 ... orifice, 44 ... orifice forming member, 44A ... inner peripheral surface, 44D ... first liquid chamber end, 46 ... elastic wall, 46A ... outer peripheral portion, 48, 50 ... partitioning plates, 56 ... coupling portion, 56A ... first coupling portion, 56B ... second coupling portion, 60 ... holding portion, 64 ... first holding portion, 66 ... second holding portion, 68 ... high compression holding portion, 74 ... depression, 76 ... low-stiffness portion, 80 ... first flat portion, 82 ... fitting projection, 82A ... outer peripheral surface, 84 ... fitting depression, 84A ... inner peripheral surface, 86 ... second flat portion, 88 ... first welding portion, 90 ... second welding portion, 92 ... swelling portion, 94 ... projection, 94B ... side surface on the side of the second liquid chamber, C ... circumferential direction, Ko ... radially outward, Ki ... radially inward, X ... axial direction, Xo ... axially outward

BEST MODES FOR CARRYING OUT THE INVENTION

Referring now to the drawings, a liquid-sealed type vibration isolator according to an embodiment of the present invention will be described.

Figure 1:
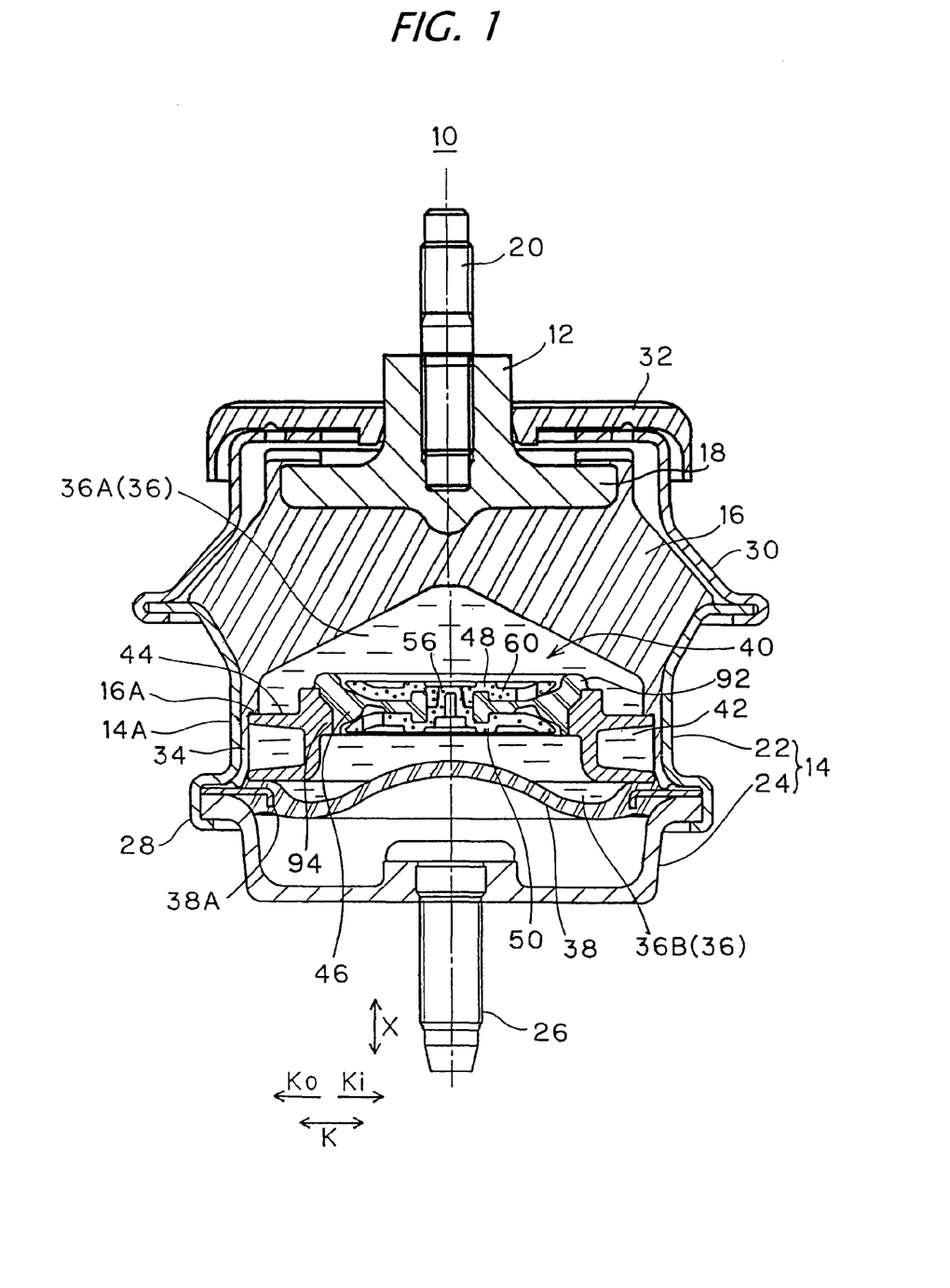
FIG. 1 is a vertical cross-sectional view of a liquid-sealed type vibration isolator according to an embodiment of the present invention.

FIG. 1 is a vertical cross-sectional view of a liquid-sealed type vibration isolator 10 according to an embodiment. The vibration isolator 10 includes an upper first fixture 12 to be mounted to an engine of an automotive vehicle, a lower cylindrical second fixture 14 to be mounted on a vehicle frame, and a vibration-isolating base member 16 formed of a rubbery elastic material for coupling these members.

The first fixture 12 is a boss metal fitting arranged at an upper portion of the axial center of the second fixture 14 and includes a stopper portion 18 projecting radially (the direction perpendicular to an axis, which is a direction vertical to an axial direction X) K outwardly Ko in a flange shape. A mounting bolt 20 is provided in an upper end portion so as to project upward so as to be fixable to the engine side via the bolt 20.

The second fixture 14 includes a cylindrical attachment 22 in which the vibration-isolating base member 16 is formed by vulcanizing molding and a cup-shaped bottom attachment 24. The second fixture 14 is formed with a mounting bolt 26 projecting downward at a center portion of the bottom attachment 24, so as to be mounted on the vehicle body side via the bolt 26. The cylindrical attachment 22 is caulked at a lower end portion thereof to an upper end opening of the bottom attachment 24 via a caulking portion 28. Reference numeral 30 designates a stopper attachment caulked at an upper end portion of the cylindrical attachment 22, and demonstrates an action as a stopper in cooperation with the stopper portion 18 of the first fixture 12. Reference numeral 32 designates a stopper rubber covering an upper surface of the stopper attachment 30.

The vibration-isolating base member 16 is formed into a truncated conical shape, and an upper end portion thereof is bonded to the first fixture 12, and a lower end portion thereof is bonded to an upper end opening of the cylindrical attachment 22 respectively via vulcanization. A sealing wall portion 34 formed into a rubber membrane for covering an inner peripheral surface of the cylindrical attachment 22 is continued to a lower end portion of the vibration-isolating base member 16.

A diaphragm 38, which is formed of a flexible rubber membrane, is arranged so as to oppose a lower surface of the vibration-isolating base member 16 in an axial direction X, and defines a liquid-sealed chamber 36 between the lower surface and itself is mounted to the second fixture 14, and liquid is sealed in the liquid-sealed chamber 36. The liquid-sealed chamber 36 is partitioned into a first liquid chamber 36A on the side of the vibration-isolating base member 16 and a second liquid chamber 36B on the side of the diaphragm 38 by a partitioning member 40, and the first liquid chamber 36A and the second liquid chamber 36B are brought into communication with each other via an orifice 42 as a restricting flow channel. The first liquid chamber 36A is a principal liquid chamber having the vibration-isolating base member 16 as part of the chamber wall, and the second liquid chamber 36B is a secondary liquid chamber having the diaphragm 38 as part of the chamber wall.

Figure 2:
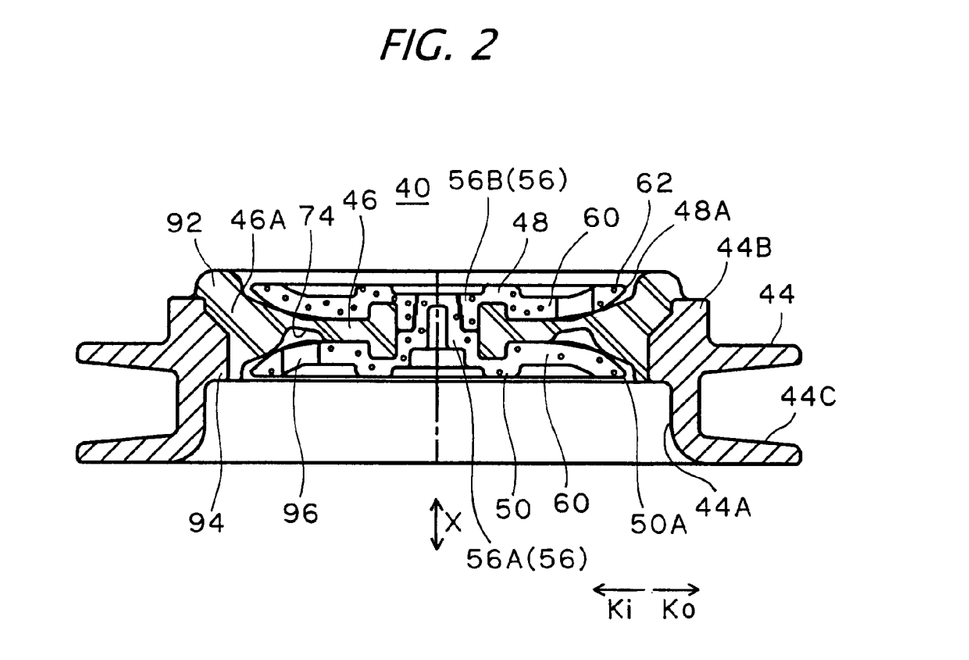
FIG. 2 is a vertical cross-sectional view of a partitioning member of the same vibration isolator.

As shown in FIGS. 1 and 2, the partitioning member 40 includes an annular orifice forming member 44 provided inside a cylindrical peripheral wall portion 14A of the second fixture 14, an elastic wall 46 formed of a rubber elastic member bonded at an outer peripheral portion 46A thereof to an inner peripheral surface 44A of the orifice forming member 44 by means of vulcanization and closing the space inside the inner peripheral surface 44A, and a pair of upper and lower partitioning plates 48 and 50 configured to clamp the elastic wall 46 therebetween in the axial direction X.

The orifice forming member 44 is a member formed of rigid material forming the orifice 42 extending in the circumferential direction with the peripheral wall portion 14A of the second fixture 14 therebetween, and is fitted to the sealing wall portion 34 on the inner periphery of the peripheral wall portion 14A. More specifically, the orifice forming member 44 includes a cylindrical portion 44B arranged coaxially with the peripheral wall portion 14A of the second fixture 14, and a depressing groove portion 44C opened outward in an angular C-shape-section on the outer periphery side of the cylindrical portion 44B. The inner peripheral surface of the cylindrical portion 44B corresponds to the above-described inner peripheral surface 44A. The orifice 42 is formed by the depressing groove portion 44C in cooperation with the peripheral wall portion 14A of the second fixture 14.

The orifice forming member 44 is fixedly held between a reinforcing attachment 38A embedded in the outer peripheral edge portion of the diaphragm 38 and a receiving shoulder portion 16A formed on the lower outer peripheral portion of the vibration-isolating base member 16. Specifically, the reinforcing attachment 38A provided on the outer peripheral edge portion of the diaphragm 38 is fixed by caulking with the caulking portion 28 of the second fixture 14, and the lower end portion of the orifice forming member 44 is supported by the reinforcing attachment 38A via the rubber portion of the diaphragm 38 which covers the inner peripheral edge portion of the reinforcing attachment 38A.

Figure 3:
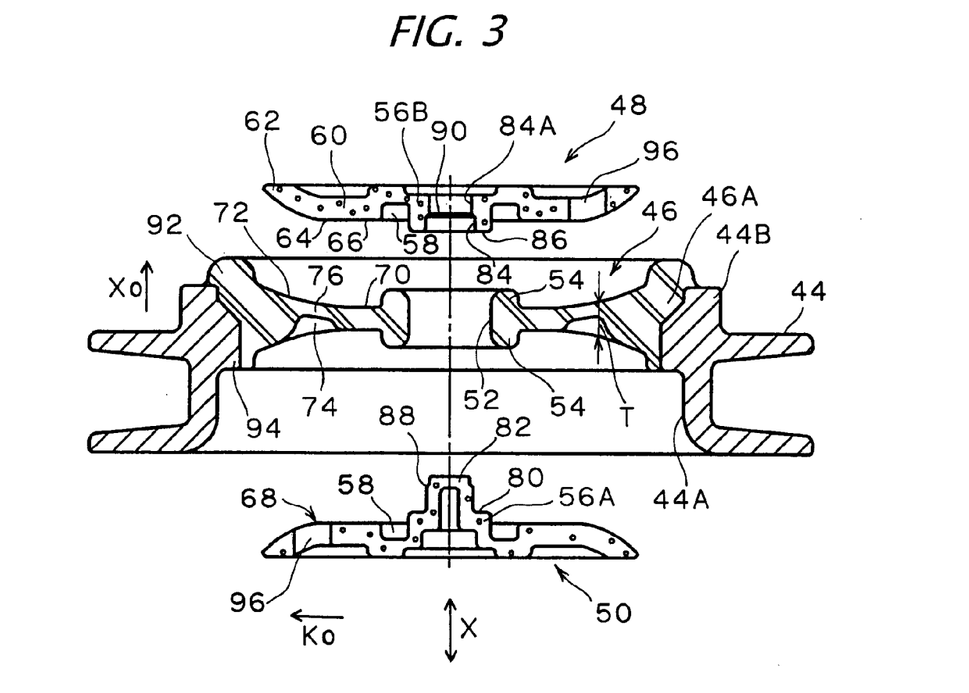
FIG. 3 is an exploded vertical cross-sectional view showing the same partitioning member.

The elastic wall 46 is formed into a circular shape in plan view and, as shown in FIG. 3, the outer peripheral portion 46A is bonded to the inner peripheral surface 44A of the cylindrical portion 44B of the orifice forming member 44 by means of vulcanization. The elastic wall 46 includes a circular through hole 52 penetrating through a radially center portion thereof in the axial direction X, and an annular projecting ridge 54 projecting in the axial direction X is provided on the front and back sides around the through hole 52.

Figure 4:
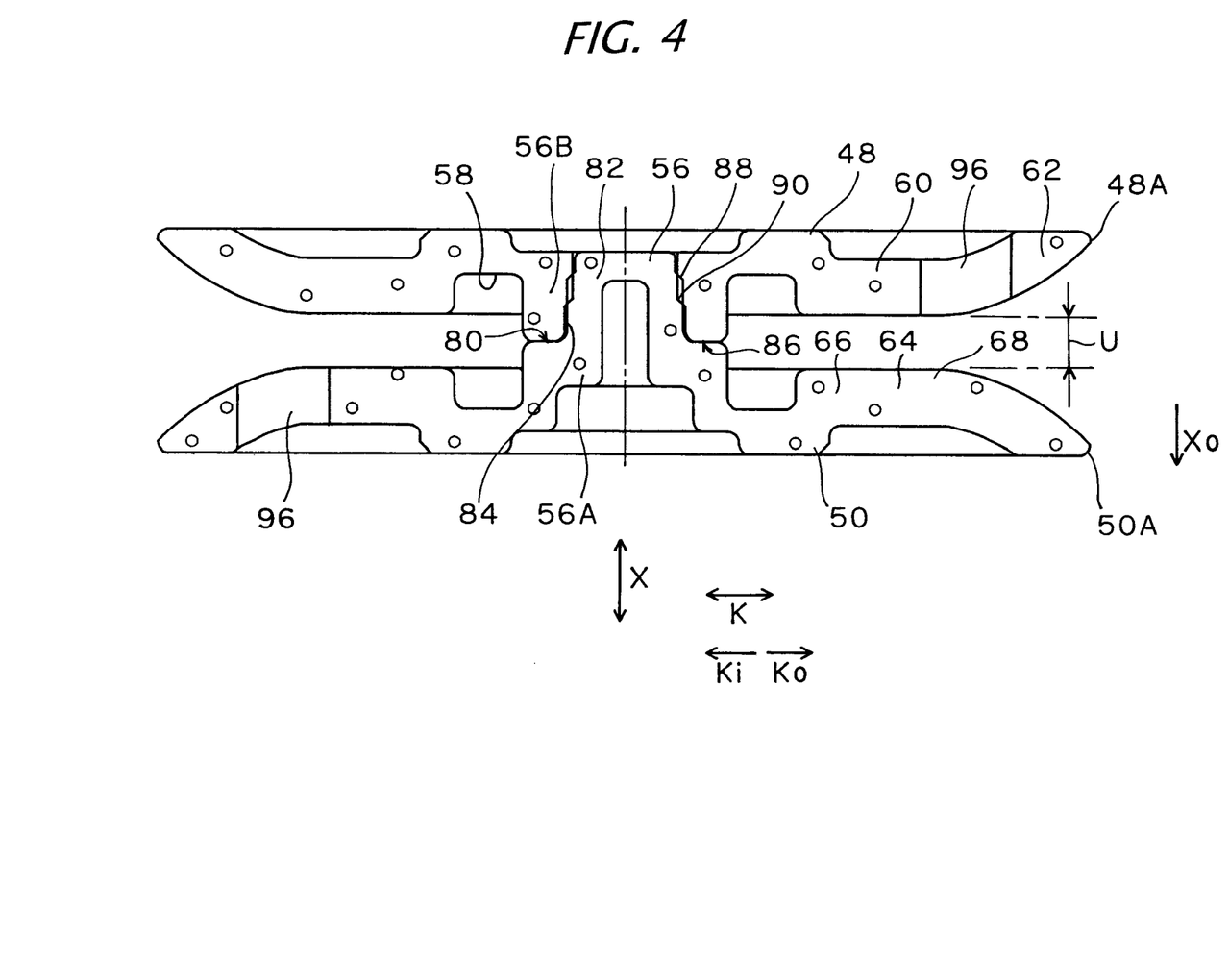
FIG. 4 is a vertical cross-sectional view of the same partitioning member with an elastic wall omitted.

The pair of partitioning plates 48 and 50 are coupled with each other via a cylindrical coupling portion 56 penetrating through the through hole 52 as shown in FIGS. 2 and 4, and are formed integrally of thermoplastic resin. The partitioning plate 48, which is (upper) one, constitutes part of a chamber wall of the first liquid chamber 36A, that is, is arranged so as to face the first liquid chamber 36A (see FIG. 1). The partitioning plate 50, which is the other (lower) one, constitutes part of the chamber wall of the second liquid chamber 36B, that is, is arranged so as to face the second liquid chamber 36B. Then, the amount of displacement in the axial direction X of the pair of the partitioning plates 48 and 50 is restricted by the elastic wall 46.

The pair of partitioning plates 48 and 50 are formed to have an outer dimension smaller than the elastic wall 46 in plan view. In other words, outer peripheral edges 48A, 50A of the partitioning plates 48 and 50 terminate on the radially inward Ki of the inner peripheral surface 44A of the orifice forming member 44 where the outer peripheral edge of the elastic wall 46 is positioned (see FIG. 2).

The pair of partitioning plates 48 and 50 are provided with annular grooves 58, respectively, in which the upper and lower projecting ridges 54 of the elastic wall 46 fit, around the coupling portion 56 at the center portions thereof. Provided on the outer peripheries, that is, on the radially outward Ko of the annular grooves 58 are holding portions 60 which extend over the entire circumference in an annular shape so as to hold the elastic wall 46 as sandwiched therebetween in the axial direction X. In addition, provided on the outer peripheries, that is, on the radially outward Ko of the holding portions 60 are space forming portions 62 which form a space S (see FIG. 6) widening as it goes radially outward Ko between opposing wall surfaces of the elastic wall 46, so that the space forming portions 62 constitute outer peripheral edge portions of the partitioning plates 48 and 50.

Figure 6:
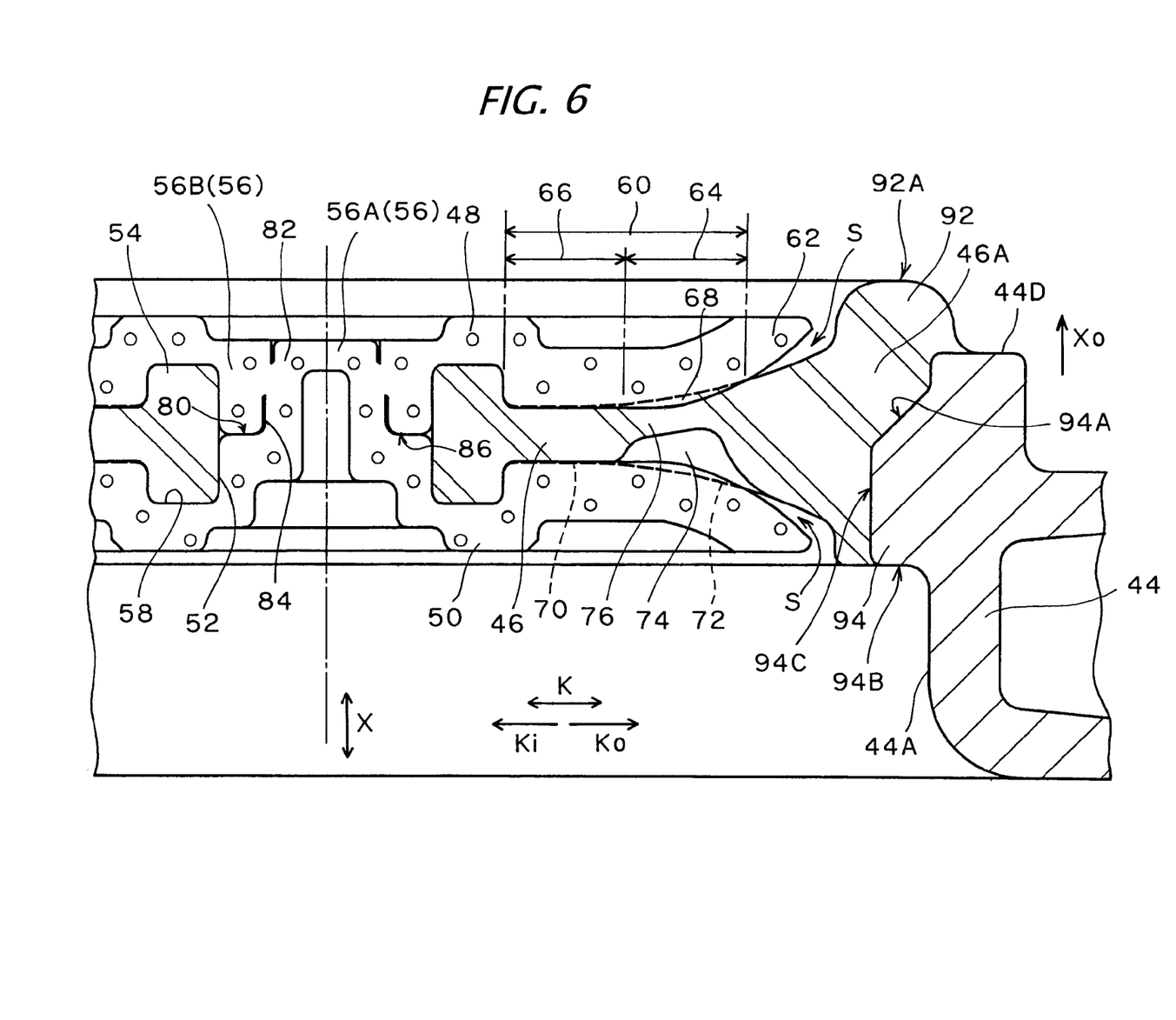
FIG. 6 is an enlarged cross-sectional view showing a principal portion of the same partitioning member.

As shown in FIG. 6, when assuming that the holding portion 60 consists of a first holding portion 64 on the side radially outward Ko, that is, on the side of the outer periphery and a second holding portion 66 on the side radially inward Ki, that is, on the side of the inner periphery with respect to the radially center as a boundary, a high-compression holding portion 68 which hold the elastic wall 46 at a higher compression ratio in the axial direction X than the second holding portion 66 is provided in the first holding portion 64. In other words, the holding portion 60 includes the high-compression holding portion 68 set to have a highest compression ratio in the axial direction X of the elastic wall 46 in the first holding portion 64 on the outer peripheral side, and the compression ratio in the high-compression holding portion 68 is set to be higher than the compression ratio on the radially inward Ki and the compression ratio on the radially outward Ko. Here, the compression ratio in the axial direction X of the elastic wall 46 is a value calculated by dividing the amount of compression of the elastic wall 46 in the axial direction X by the pair of partitioning plates 48 and 50 by the original thickness of the elastic wall 46, and is defined as $(T-U)/T$ where U is the distance between the pair of the partitioning plates 48 and 50 at a target portion (see FIG. 4) and T is an original thickness of the elastic wall 46 at the target portion (see FIG. 3). Then, the compression ratio at the high-compression holding portion 68 is set to be high so that the high-compression holding portion 68 does not come apart from the wall surface of the elastic wall 46, that is, so that the compression remains even with a maximum credible displacement of the partitioning plates 48, 50 in the axial direction X.

More specifically, in this example, as shown in FIG. 6, the compression ratio in the axial direction X of the elastic wall 46 is set to be substantially constant in the second holding portion 66 of the inner peripheral side, the compression ratio is increased gradually as it goes radially outward Ko in the first holding portion 64 of the outer peripheral side, the compression ratio becomes maximum in the high-compression holding portion 68, the compression ratio is reduced gradually therefrom as it goes radially outward Ko until the space forming portion 62 where the space S is formed.

In order to set the compression ratio in this manner, the pair of partitioning plates 48 and 50 and the elastic wall 46 are formed to have shapes as described below respectively in cross section. The partitioning plates 48 and 50 are formed to be flat in the direction perpendicular to the axial direction X so as to have a constant distance U from the second holding portion 66 to the high-compression holding portion 68 of the first holding portion 64 in the radial direction K, and to be gradually inclined axially outward Xo as it goes radially outward Ko on the outer peripheral side with respect to the high-compression holding portion 68 (see FIGS. 4, 6). In contrast, the elastic wall 46 is formed to have a wall surface 70 opposing the second holding portion 66 so as to be flat perpendicularly to the axial direction X, and the outer periphery thereof, that is, a wall surface 72 opposing the first holding portion 64 and a portion radially outward Ko of the first holding portion 64 (that is, the gap forming portion 62) of the partitioning plate is formed so as to be inclined axially outward Xo as it goes radially outward Ko (see FIGS. 3, 6). Accordingly, the outer peripheral portion 46A of the elastic wall 46 is formed to be thicker. The inclined surfaces of the partitioning plates 48 and 50 on the outer peripheral side with respect to the high-compression holding portion 68 and the inclined surface of the wall surface 72 of the elastic wall 46 are formed to be a curved surface, and the inclination of the former is set to be larger. Accordingly, the space S is formed to be gradually widened as it goes radially outward Ko.

Figure 5:
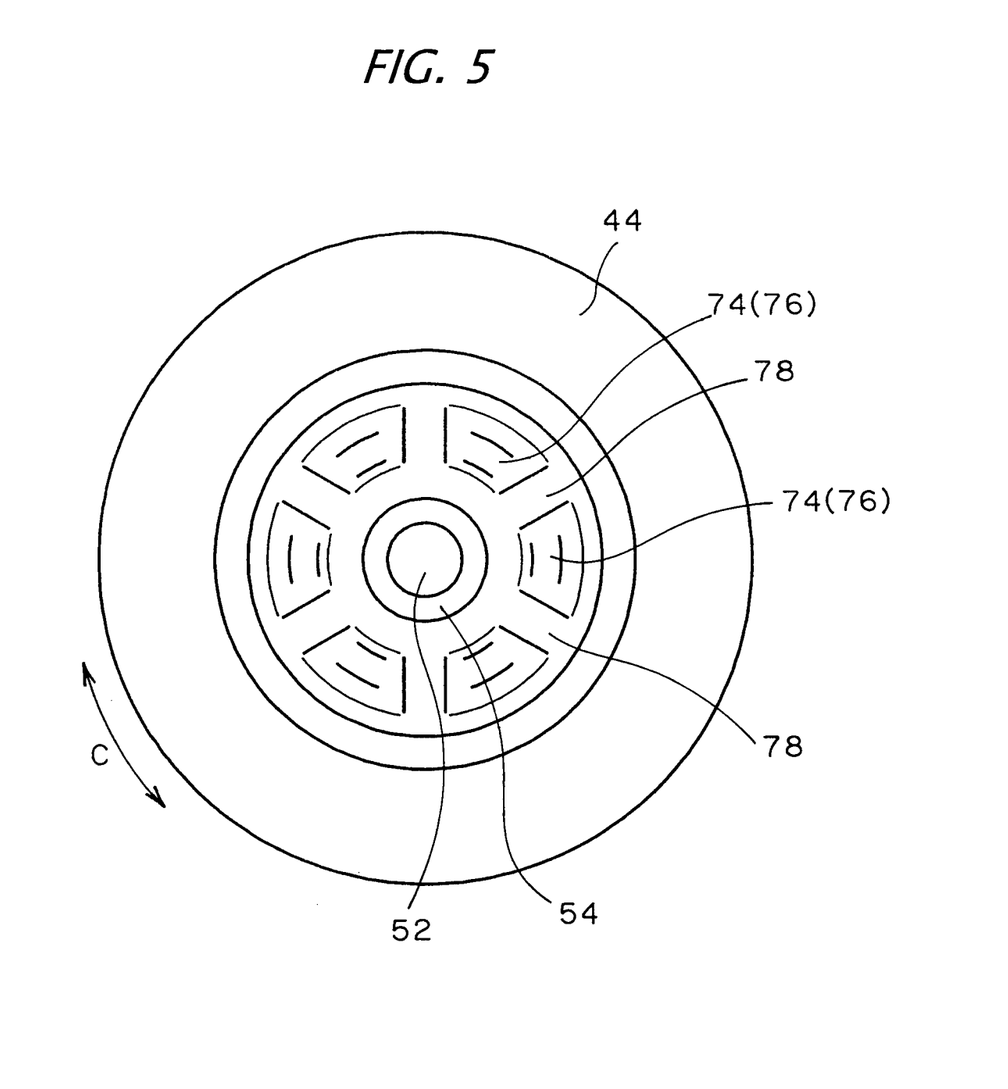
FIG. 5 is a bottom view of the same partitioning member.

As shown in FIG. 6, the elastic wall 46 is provided on the wall surface thereof with a depression 74 which is depressed in the axial direction X at a portion of the elastic wall portion held between the high compression holding portions 68. The depression 74 in this example is provided on the wall surface (the lower wall surface) opposing the second liquid chamber 36B and, as shown in FIG. 5, a plurality (six in this example) of the depressions 74 are provided equidistantly in the circumferential direction C. Accordingly, the portion of the elastic wall held between the high compression holding portions 68 is provided with thin low-stiffness portions 76 discontinuously in the circumferential direction C. The depressions 74 in this example are formed substantially entirely over the portion opposing the first holding portion 64 in the radial direction K. Also, as shown in FIG. 5, the depressions 74 are formed into an arcuate shape, and high-stiffness portions 78 inclined to be gradually thicker as it goes radially outward Ko are formed radially between the respective depressed portions 74 so as to connect the elastic wall portion on the inner peripheral side and the elastic wall portion on the outer peripheral side smoothly. Then, with the provision of the high-stiffness portions 78, abutment between the partitioning plate 50 and the elastic wall 46 in the high-compression holding portion 68 is achieved.

As shown in FIG. 3, the coupling portion 56 includes a first flat portion 80 perpendicular to the axial direction X provided on the one partitioning plate 50 (the lower partitioning plate in this example), a fitting projection 82 projecting from the first flat portion 80 in the axial direction X, a fitting depression 84 provided on the other partitioning plate 48 (the upper partitioning plate in this example) to allow fitting of the fitting projection 82 therein, and a second flat portion 86 provided on an edge portion of the opening of the fitting depression 84 so as to extend perpendicularly to the axial direction X.

The fitting projection 82 is a column-shaped projection provided coaxially with the axis of the partitioning plate 50, and projects upward from the first flat portion 80. The first flat portion 80 is a ring-shaped flat portion provided over the entire circumference of a root portion of the fitting projection 82. The fitting depression 84 is a depression opening downward so as to receive the fitting projection 82 from below and, in this example, opening also upward so as to penetrate through in the axial direction X. An inner peripheral surface 84A of the fitting depression 84 is formed into a cylinder shape. The second flat portion 86 is a ring-shaped flat portion provided on the lower opening end of the fitting depression 84 so as to oppose the first flat portion 80.

Figure 7:
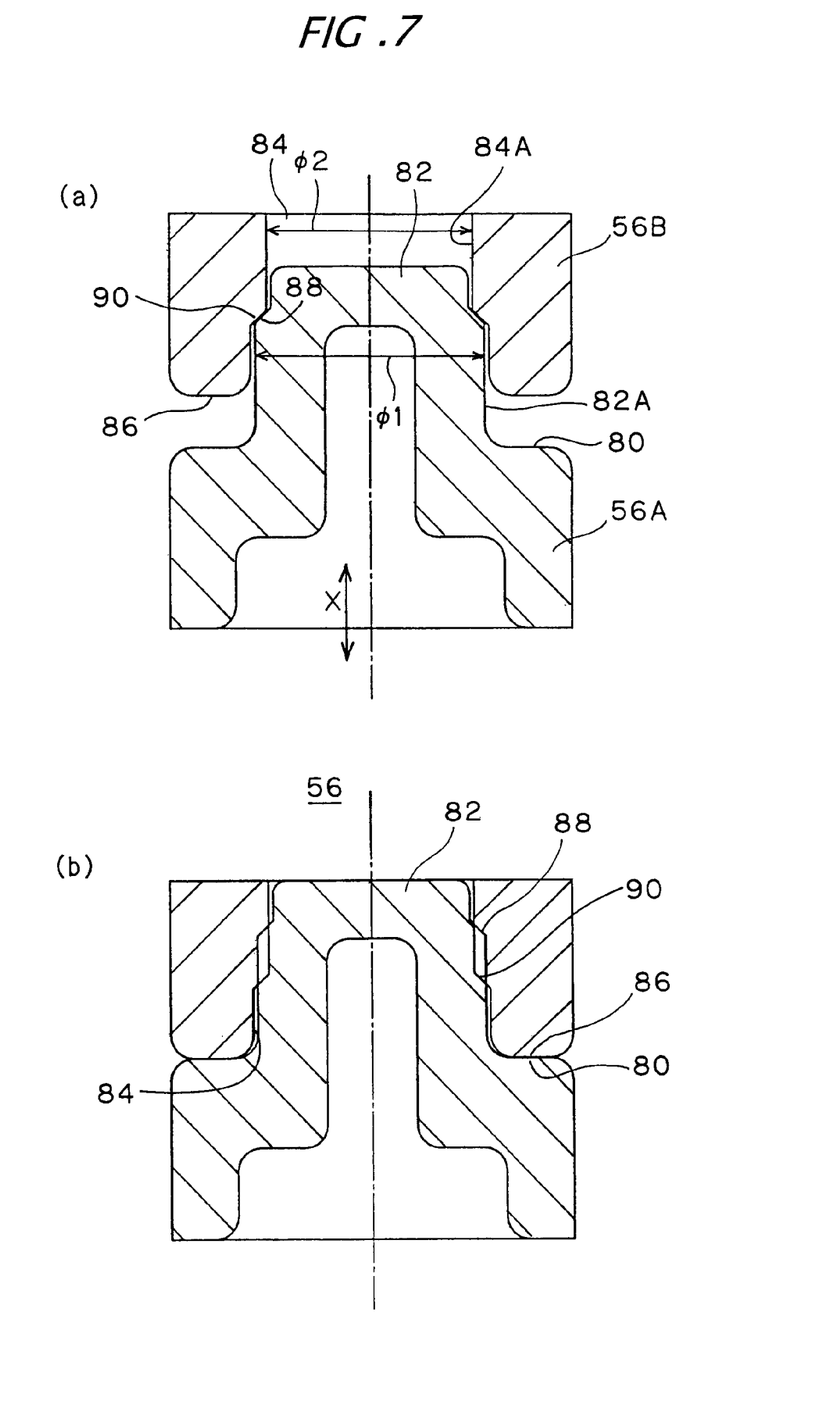
FIG. 7 is a vertical cross-sectional view of a coupling portion of the same partitioning member, in which (a) is a drawing showing a state before welding, and (b) is a drawing showing a welded state.

As shown in FIG. 7, an outer peripheral surface 82A of the fitting projection 82 is provided with a first welding portion 88 so as to be apart from the first flat portion 80 upward in the axial direction X, and the inner peripheral surface 84A of the fitting depression 84 is provided with a second welding portion 90 so as to be apart from the second flat portion 86 upward in the axial direction X. The first welding portion 88 and the second welding portion 90 are portion to be fixedly welded by means of ultrasonic welding (see FIG. 6), so that the fitting projection 82 and the fitting depression 84 are fixedly fitted by welding between the first welding portion 88 and the second welding portion 90 in a state in which the first flat portion 80 and the second flat portion 86 are positioned in the axial direction X by being contact with each other.

The first welding portion 88 and the second welding portion 90 are formed to have tapered surfaces which are fitted to each other as shown in FIG. 7. In other words, the first welding portion 88 is formed to have the tapered surface gradually reduced in diameter as it goes toward the distal end on the outer peripheral surface 82A of the fitting projection 82 at a position apart from the first flat portion 80. The second welding portion 90 is formed to have the tapered surface gradually reduced in diameter as it goes inside at the same angle of inclination as the tapered surface of the first welding portion 88 on the inner peripheral surface 84A of the fitting depression 84 at a position apart from the second flat portion 86. Then, by the abutment between the tapered surfaces, the first welding portion 88 and the second welding portion 90 are welded in a state in which the fitting projection 82 and the fitting depression 84 are positioned coaxially. A fitting margin between the fitting projection 82 and the fitting depression 84 is defined by the difference ($\phi1-\phi2$) between an outer diameter $\phi1$ of the fitting projection 82 on the side having a larger diameter than the first welding portion 88 and an inner diameter $\phi2$ of the fitting depression 84 on the side having a smaller diameter than the second welding portion 90.

As shown in FIG. 6, in this example, the coupling portion 56 includes a first coupling portion 56A provided on the lower partitioning plate 50 and inserted into the through hole 52 of the elastic wall 46 from below and a second coupling portion 56B provided on the upper partitioning plate 48 and inserted into the through hole 52 from above. The first coupling portion 56A is provided with the first flat portion 80 and the fitting projection 82, and the first coupling portion 56A is formed into a shouldered column shape having a shoulder at the first flat portion 80. Also, the second coupling portion 56B is provided with the second flat portion 86 and the fitting depression 84, and the second coupling portion 56B is formed into a hollow column shape having the same outer diameter as the large diameter portion of the first coupling portion 56A on the lower side. Then, the fitting projection 82 and the fitting depression 84 are fixedly fitted in a state in which the first flat portion 80 and the second flat portion 86 are in contact with each other at a center of the through hole 52 in the axial direction X.

In addition, in this embodiment, the following configuration is employed in order to enhance the stiffness of the root portion of the elastic wall 46 to the orifice forming member 44, and enhance the displacement restricting effect of the pair of the partitioning plates 48 and 50 at a low-frequency and a large-amplitude.

In other words, firstly, the outer peripheral portion 46A of the elastic wall 46 fixedly bonded to the inner peripheral surface 44A of the orifice forming member 44 is provided with a swelling portion 92 on a wall surface thereof on the first liquid chamber 36A side so as to swell toward the axially outward Xo, that is, toward the first liquid chamber 36A with respect to the inclined wall surface 72 of the elastic wall 46. The swelling portion 92 is formed into an annular shape extending entirely in the circumferential direction C. As shown in FIG. 6, a distal end 92A (the outer end in the axial direction X) of the swelling portion 92 is positioned on the side of the first liquid chamber 36A with respect to a first liquid chamber end 44D of the orifice forming member 44. In addition, the swelling portion 92 is formed so as to protrude axially outward Xo from the upper surface of the partitioning plate 48 on the first liquid chamber 36A side.

Secondly, the inner peripheral surface 44A of the orifice forming member 44 to which the outer peripheral portion 46A of the elastic wall 46 is fixedly bonded is provided with a projection 94 projecting radially inward Ki at the root portion of the elastic wall 46 on the side of the second liquid chamber 36B. The projection 94 is formed to have a side surface 94A inclining radially inward Ki as it goes downward on the side of the center of the elastic wall 46 in the axial direction X and a side surface 94B on the side of the second liquid chamber 36B is formed into a flat shape perpendicular to the axial direction X of the elastic wall 46 as shown in FIG. 6. The side surface 94B on the side of the second liquid chamber in the flat shape is a portion used as a surface to be pressed by a molding die in the axial direction X when molding the elastic wall 46 described later. Therefore, the root portion of the elastic wall 46 on the side of the second liquid chamber 36B is formed in a state of covering a top surface 94C and the side surface 94A on the center side except for the side surface 94B, that is, in a state in which the projection 94 is embedded.

The reference numeral 96 designates air vent holes penetrating through the partitioning plates 48 and 50 extending in the axial direction X, and a plurality of the air vent holes 96 are provided dispersedly in the circumference direction of the partitioning plates 48 and 50.

The liquid-sealed type vibration isolator 10 can be manufactured in the following manner.

Figure 8:
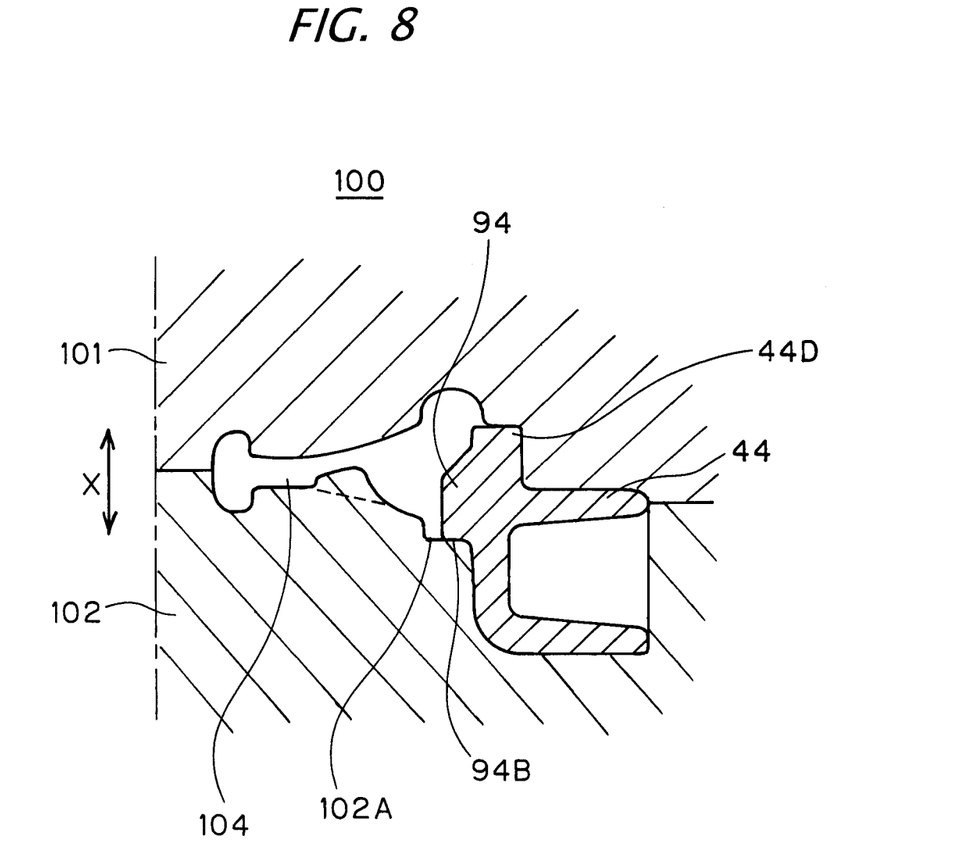
FIG. 8 is an enlarged cross-sectional view of a principal portion of an orifice forming member and an elastic wall which constitute the partitioning member when forming a vulcanizing molding member.

When manufacturing the partitioning member 40, the elastic wall 46 is molded in the orifice forming member 44 by means of vulcanization. In the case of the vulcanizing molding, as shown in FIG. 8, a molding die 100 including a first die 101 used for forming the wall surface of the elastic wall 46 on the side of the first liquid chamber 36A and a second die 102 used for forming the wall surface of the elastic wall 46 on the side of the second liquid chamber 36B is used, and rubber material is injected into a cavity 104 formed between the first die 101 and the second die 102 to form the elastic wall 46 by means of vulcanization.

At this time, the first die 101 is pressed against the first liquid chamber end 44D of the orifice forming member 44 in the axial direction X at the root portion of the elastic wall 46 on the side of the first liquid chamber 36A so as to prevent formation of rubber burr at the root portion of the elastic wall 46 with respect to the orifice forming member 44, so that leakage of the rubber material from the cavity 104 is prevented.

In contrast, at the root portion of the elastic wall 46 on the side of the second liquid chamber 36B, a shouldered surface 102A of the second die 102 is pressed against the flat-shaped side surface 94B of the projection 94 provided on the orifice forming member 44 in the axial direction X. Accordingly, the leakage of the rubber material from this portion is prevented, so that generation of the rubber burr is restrained. If the elastic wall is fixedly bonded to a flat inner peripheral surface of the orifice forming member as-is without providing the projection as in Patent Document 2 as described above, it is necessary to seal the rubber material by bringing the outer peripheral surface of the second die 102 into tight contact with the inner peripheral surface of the orifice forming member 44. However, in terms of the dimensional tolerances of the orifice forming member 44, it is difficult to seal the second die 102 by bringing the same into abutment without a gap, and hence the rubber burr may easily be generated. In contrast, by using the side surface 94B of the projection 94 as a surface to be pressed in the axial direction X, generation of the rubber burr is advantageously be prevented without the problem as described above.

After having performed the vulcanizing molding of the elastic wall 46 in this manner, as shown in FIG. 3, the elastic wall 46 is placed between the partitioning plates 48 and 50 from the both front and back sides thereof, and the coupling portion 56 is secured by means of the ultrasonic welding, so that the partitioning member 40 as shown in FIG. 2 is obtained.

The ultrasonic welding is a processing technique to melt the thermoplastic resin instantaneously by minute ultrasonic vibrations and pressing force for bonding and, for example, welding is achieved in a period as short as one second or less using the ultrasonic wave having an amplitude of 35 μm at a frequency of 20 kHz.

In this embodiment, the fitting projection 82 of the lower partitioning plate 50 is fitted into the fitting depression 84 of the upper partitioning plate 48 as shown in FIG. 7(a) in a state of holding the elastic wall 46 therebetween. In this state, the first flat portion 80 and the second flat portion 86, which are the positioning portion in the axial direction X, are not in abutment with each other, and the tapered surfaces of the first welding portion 88 and the second welding portion 90 come into abutment with each other. In this state, as shown in FIG. 7(a), the outer peripheral surface 82A of the fitting projection 82 and the inner peripheral surface 84A of the fitting depression 84 are not into abutment with each other except for the tapered surfaces.

In this state, when the ultrasonic wave is applied to the upper and lower partitioning plates 48 and 50 while pressurizing the upper and lower partitioning plates 48 and 50 in the direction to hold the elastic wall 46, heat is generated at the taper surfaces which are portion of abutment between resins and hence the tapered surfaces are melted, whereby the fitting projection 82 advances within the fitting depression 84 inward in the axial direction X. The advancement is stopped when the first flat portion 80 and the second flat portion 86 comes into abutment with each other (see FIG. 7(b)). Therefore, by terminating the pressurization and the application of the ultrasonic wave at that time point, the first welding portion 88 and the second welding portion 90 are fixedly welded in a state in which the first flat portion 80 and the second flat portion 86 are not substantially welded but are in contact with each other.

By using the partitioning member 40 obtained in this manner and a product of vulcanizing molding including the first fixture 12, the cylindrical attachment 22, and the vibration-isolating base member 16 obtained by separately molding by means of vulcanization, the partitioning member 40 is inserted into the interior of the cylindrical attachment 22 under liquid. Then, after having covered with the diaphragm 38, the members are taken out from the liquid, and the bottom attachment 24 is placed thereon. The cylindrical attachment 22 and the bottom attachment 24 are then fixedly caulked with the caulking portion 28, so that the liquid is sealed therein. Then, the stopper attachment 30 is attached to the upper end opening of the cylindrical attachment 22 by caulking. In this manner, the liquid-sealed type vibration isolator 10 is manufactured.

With the liquid-sealed type vibration isolator 10 according to this embodiment configured as described above, when the minute amplitude vibrations in a high frequency range is generated, the pair of partitioning plates 48 and 50 make a reciprocating motion integrally, so that the liquid pressure of the first liquid chamber 36A is absorbed and hence the vibrations are reduced. Consequently, the dynamic spring constant can be effectively lowered with respect to the high-frequency minute amplitude vibrations.

In contrast, when a large amplitude vibrations in the low-frequency range is generated, the amount of displacement of the pair of the partitioning plates 48 and 50 is restricted by the elastic wall 46. Therefore, the liquid is allowed to circulate between the first liquid chamber 36A and the second liquid chamber 36B through the orifice 42, whereby the vibrations can be damped with the liquid flow effect. Therefore, the damping performance in the low-frequency range and the lowering of the dynamic spring constant in the high frequency range are both achieved.

Figure 9:
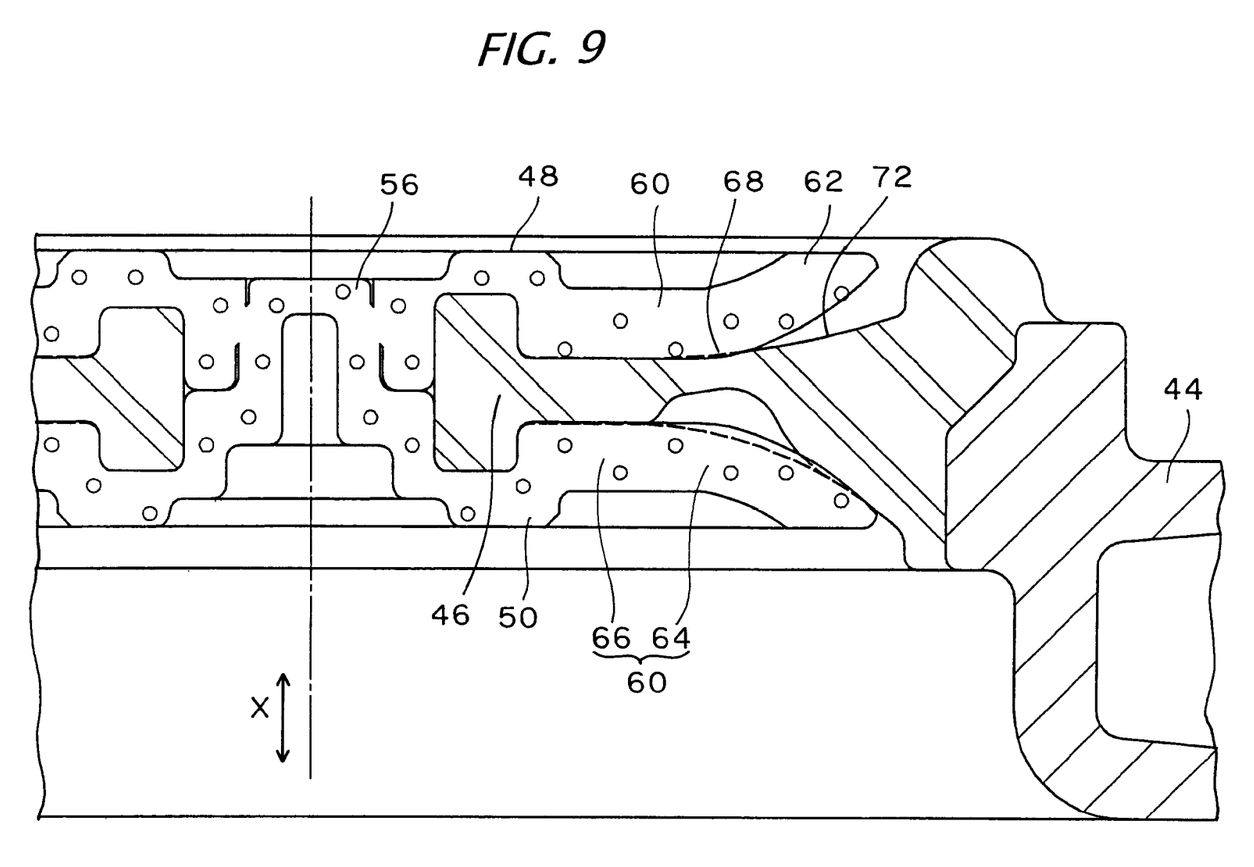
FIG. 9 is an enlarged cross-sectional view showing a principal portion of the same partitioning member when displace to the maximum in the axial direction.

According to this embodiment, since the high compression holding portions 68 having a high compression ratio in the axial direction X are provided on the radially outward Ko side in the holding portions 60 of the partitioning plates 48 and 50, the amount of displacement of the partitioning plates 48 and 50 in the axial direction X until the partitioning plates 48 and 50 start to move away from the elastic wall 46 can be set to be large. In other words, when the partitioning plates 48 and 50 are displaced excessively upward as shown in FIG. 9 for example, the upper partitioning plate 48 makes an attempt to move away from the elastic wall 46 from the outer peripheral edge side thereof. However, with the provision of the high compression holding portions 68 on the outer peripheral sides which are the starting points of separation, the contact state with respect to the elastic wall 46 can be maintained in the high compression holding portions 68. In particular, in this example, even when the maximum imaginable displacement in the axial direction X is generated, since the compression ratio of this portion is set to be high so as to prevent the high compression holding portions 68 from moving away from the wall surfaces of the elastic wall 46, movement of the holding portion 60 away from the elastic wall 46 is prevented as shown in FIG. 9, so that the generation of the abnormal sound can be prevented.

According to this embodiment, the high compression holding portions 68 are provided on the radially outward Ko side in the holding portions 60 of the partitioning plates 48 and 50, and the compression ratio is not enhanced entirely in the radial direction K. Therefore, easiness of the reciprocating motion of the partitioning plates 48 and 50 with respect to the high-frequency vibrations can be secured while restraining increase of stiffness of the entire elastic wall 46, so that the effect of lowering the dynamic spring constant can be maintained. Also, at the time of assembly of the partitioning member 40, the defective welding at the coupling portion 56 due to the reaction force of the rubber of the elastic wall 46 compressed in the axial direction X can be avoided, so that a good assembleability of the partitioning member 40 is achieved.

Also, since the thin low-stiffness portions 76 are provided on the portion of the elastic wall 46 held between the high compression holding portions 68 discontinuously in the circumferential direction C, the compression ratio in the axial direction X can be enhanced so as to avoid the movement of the partitioning plates 48 and 50 away from the elastic wall 46 without hardening the portion of the elastic wall 46 held between the first holding portions 64 located radially outward Ko where the high compression holding portions 68 reside, or even while maintaining the corresponding portion to be soft.

Also, by providing the soft portions on the elastic wall 46 with the provision of the low-stiffness portions 76, the partitioning plates 48 and 50 can be moved easily reciprocally in the axial direction X with respect to the minute amplitude vibrations in the high-frequency range, so that the dynamic spring constant can be lowered. Furthermore, since the low-stiffness portions 76 are provided on the first holding portion 64 on the outer peripheral side, the smooth reciprocating motion of the pair of partitioning plates 48 and 50 in the axial direction X is achieved while restraining the displacement in the twisted direction which may cause inclination of the axial center when vibrations in the high frequency range are input, so that the effect of lowering of the dynamic spring constant in a high-frequency range can further be enhanced. Since the low-stiffness portions 76 are provided on the portions of the elastic wall 46 held between the pair of partitioning plates 48 and 50, the displacement in the reciprocating motion of the pair of partitioning plates 48 and 50 can be restrained by the elastic wall 46 as in the case where the low-stiffness portion 76 is not provided at the time of the large amplitude oscillation.

In this embodiment, since the depressions 74 are provided on only one of the wall surfaces (lower surface) of the elastic wall 46 in order to provide the low-stiffness portions 76, the holding portion 60 of the partitioning plate 48 can be brought into abutment entirely with the other wall surface (upper surface), so that the abnormal sound can hardly be generated. The depressions 74 can be provided only on the upper surface of the elastic wall 46, or on both the upper and lower surfaces.

According to this embodiment, since the outer peripheral portion 46A of the elastic wall 46 is formed to be thick, the displacement in the reciprocating motion of the partitioning plates 48 and 50 can be restrained effectively at the time of the large amplitude vibrations in the low-frequency range.

According to this embodiment, since the swelling portion 92 is provided on the outer peripheral portion 46A of the elastic wall 46 and the projection 94 is provided on the inner peripheral surface 44A of the orifice forming member 44 to which the outer peripheral portion 46A is fixedly bonded, the stiffness of the outer peripheral portion 46A of the elastic wall 46 can be enhanced, and hence the effect of restriction of the displacement of the partitioning plates 48 and 50 at the time of the large amplitude vibrations can further be enhanced. Also, since the swelling portion 92 provided on the side of the first liquid chamber 36A is formed of rubber, even when the vibration-isolating base member 16 is displaced excessively downward and collides with the swelling portion 92, damages of the vibration-isolating base member 16 can be prevented.

According to this embodiment, the pair of partitioning plates 48 and 50 are welded at a fitting portion between the fitting projection 82 and the fitting depression 84 provided respectively at the center portions thereof and the first welding portion 88 and the second welding portion 90 as the welding portions are formed of tapered surfaces so as to be fitted to each other. Therefore, the axial displacement between the upper partitioning plate 48 and the lower partitioning plate 50 (the displacement in the radial direction) can be effectively prevented.

Since the positioning in the axial direction X is performed by bringing the first flat portion 80 and the second flat portion 86 into contact with each other without substantially welding the same, accurate positioning is achieved, and the displacement in parallelism can be prevented effectively in cooperation with the fitting between the tapered surfaces. The contact between the first flat portion 80 and the second flat portion 86 with respect to each other with a small amount of welding is not considered to be substantially welded as long as the positioning effect in the axial direction X is not impaired, and such mode is also included in the present invention.

Furthermore, since the positioning portion in the axial direction X and the welding portion between the first welding portion 88 and the second welding portion 90 are set apart from each other in the axial direction X, that is, provided at positions apart from each other, the chippings of the resin generated by welding are prevented from advancing to the positioning portion, so that the positional displacement can be prevented. In this manner, since the positional displacement in the axial direction X, and in coaxiality or parallelism which may occur when fixedly coupling the pair of partitioning plates 48 and 50 can be restrained and thus fluctuations in vibration insulating performance can be restrained.

INDUSTRIAL APPLICABILITY

The present invention can be used as an engine mount for an automotive vehicle or other various types of vibration isolators for automotive vehicles configured to couple an oscillating members and a supporting member, and may also be applied to various types of vehicles other than the automotive vehicles.

The invention claimed is:

1. A liquid-sealed type vibration isolator, comprising:
a first fixture;
a cylindrical second fixture;
a vibration-isolating base member formed of a rubbery elastic material for coupling the first fixture and the second fixture;
a diaphragm formed of a rubbery elastic membrane which is mounted to the second fixture and defines a liquid-sealed chamber between the vibration-isolating base member and itself;
a partitioning member configured to partition the liquid-sealed chamber into a first liquid chamber on the side of the vibration-isolating base member and a second liquid chamber on the side of the diaphragm, and an orifice configured to communicate the first liquid chamber and the second liquid chamber;
wherein the partitioning member comprises:
an annular orifice forming member provided inside a peripheral wall portion of the second fixture and forming the orifice;
an elastic wall formed of the rubbery elastic material which closes the inner peripheral surface of the orifice forming member; and
a pair of partitioning plates connected to each other via a coupling portion penetrating through the radially center portion of the elastic wall and holding the elastic wall therebetween in the axial direction of the elastic wall, wherein the pair of partitioning plates each comprises a holding portion which holds the elastic wall radially outward of the coupling portion, the holding portion comprises a first holding portion provided radially outward and a second holding portion provided radially inward, and the first holding portion is provided with a high compression holding portion configured to hold the elastic wall at a compression ratio higher than the second holding portion in the axial direction, and wherein the elastic wall is provided with a plurality of depressions in the circumferential direction on at least one of front and back wall surfaces of the elastic wall in an elastic wall portion to be held between the high compression holding portions, thereby having thin low-stiffness portions discontinuously in the circumferential direction in the elastic wall portion.

2. The liquid-sealed type vibration isolator according to claim 1, wherein the depressions are provided on only one of the front and back wall surface of the elastic wall.

3. A liquid-sealed type vibration isolator, comprising:
a first fixture;
a cylindrical second fixture;
a vibration-isolating base member formed of a rubbery elastic material for coupling the first fixture and the second fixture;
a diaphragm formed of a rubbery elastic membrane which is mounted to the second fixture and defines a liquid-sealed chamber between the vibration-isolating base member and itself;
a partitioning member configured to partition the liquid-sealed chamber into a first liquid chamber on the side of the vibration-isolating base member and a second liquid chamber on the side of the diaphragm, and an orifice configured to communicate the first liquid chamber and the second liquid chamber;
wherein the partitioning member comprises:
an annular orifice forming member provided inside a peripheral wall portion of the second fixture and forming the orifice;
an elastic wall formed of the rubbery elastic material which closes the inner peripheral surface of the orifice forming member; and
a pair of partitioning plates connected to each other via a coupling portion penetrating through the radially center portion of the elastic wall and holding the elastic wall therebetween in the axial direction of the elastic wall,
wherein the pair of partitioning plates each comprises a holding portion which holds the elastic wall radially outward of the coupling portion, the holding portion comprises a first holding portion provided radially outward and a second holding portion provided radially inward, and the first holding portion is provided with a high compression holding portion configured to hold the elastic wall at a compression ratio higher than the second holding portion in the axial direction,
wherein a wall surface of the elastic wall opposing the first holding portion of the pair of partitioning plates and the portions disposed radially outward of the first holding portion of the pair of partitioning plates is formed into an inclined surface,
wherein the inclined surface inclines axially outward as the inclined surface goes radially outward, so that the outer peripheral portion of the elastic wall is formed to be thick, and wherein the elastic wall fixedly bonded to the inner peripheral surface of the orifice forming member is provided on the outer peripheral portion thereof with a swelling portion configured to enhance the stiffness of the outer peripheral portion of the elastic wall by swelling axially outward with respect to the inclined wall surface.

4. The liquid-sealed type vibration isolator according to claim 3, wherein the orifice forming member to which the outer peripheral portion of the elastic wall is fixedly bonded is provided on the inner peripheral surface thereof with a projection configured to enhance the stiffness of the outer peripheral portion of the elastic wall by projecting radially inward.

5. The liquid-sealed type vibration isolator according to claim 3, wherein the outer peripheral portion of the elastic wall fixedly bonded to the inner peripheral surface of the orifice forming member is formed with the swelling portion swelling toward the first liquid chamber from a wall surface of the elastic wall on the side of the first liquid chamber with respect to the inclined wall surface, and the distal end of the swelling portion is positioned on the side of the first liquid chamber with respect to the end of the orifice forming member on the side of the first liquid chamber, and
the inner peripheral surface of the orifice forming member to which the outer peripheral portion of the elastic wall is fixedly bonded is formed with the projection projecting radially inward at a root portion of the elastic wall on the side of the second liquid chamber, the side surface of the projection on the side of the second liquid chamber is formed into a flat surface perpendicular to the axial direction of the elastic wall, and the side surface of the projection on the side of the second liquid chamber is used as a pressing surface in the axial direction with respect to a molding die at the time of molding the elastic wall.

6. A liquid-sealed type vibration isolator, comprising:
a first fixture;
a cylindrical second fixture;
a vibration-isolating base member formed of a rubbery elastic material for coupling the first fixture and the second fixture;
a diaphragm formed of a rubbery elastic membrane which is mounted to the second fixture and defines a liquid-sealed chamber between the vibration-isolating base member and itself;
a partitioning member configured to partition the liquid-sealed chamber into a first liquid chamber on the side of the vibration-isolating base member and a second liquid chamber on the side of the diaphragm, and an orifice configured to communicate the first liquid chamber and the second liquid chamber;
wherein the partitioning member comprises:
an annular orifice forming member provided inside a peripheral wall portion of the second fixture and forming the orifice;
an elastic wall formed of the rubbery elastic material which closes the inner peripheral surface of the orifice forming member; and
a pair of partitioning plates connected to each other via a coupling portion penetrating through the radially center portion of the elastic wall and holding the elastic wall therebetween in the axial direction of the elastic wall,
wherein the pair of partitioning plates each comprises a holding portion which holds the elastic wall radially outward of the coupling portion, the holding portion comprises a first holding portion provided radially outward and a second holding portion provided radially inward, and the first holding portion is provided with a high compression holding portion configured to hold the elastic wall at a compression ratio higher than the second holding portion in the axial direction, and wherein the coupling portion includes a first flat portion provided on one of the partitioning plates so as to extend perpendicularly to the axial direction, a fitting projection projecting axially from the first flat portion, a fitting depression provided on the other partitioning plate so as to allow fitting of the fitting projection, and a second flat portion provided on an opening edge portion of the fitting depression so as to extend perpendicularly to the axial direction, the outer peripheral surface of the fitting projection is provided with a first welding portion apart from the first flat portion in the axial direction and the inner peripheral surface of the fitting depression is provided with a second welding portion apart from the second flat portion in the axial direction, and the fitting projection and the fitting depression are fixedly fitted by welding between the first welding portion and the second welding portion in a state in which the first flat portion and the second flat portion are in contact with each other.

7. The liquid-sealed type vibration isolator according to claim 6, wherein the first welding portion and the second welding portion are formed into tapered surfaces fitted to each other, and the first welding portion and the second welding portion are welded in a state in which the fitting projection and the fitting depression are positioned coaxially by the abutment between the tapered surfaces.

8. The liquid-sealed type vibration isolator according to claim 6, wherein the elastic wall includes a through hole which allows penetration of the coupling portion, the coupling portion includes a first coupling portion provided on one of the partitioning plates and configured to be inserted into the through hole from one side in the axial direction and a second coupling portion provided on the other partitioning plate and configured to be inserted into the through hole from the other side in the axial direction, and the first coupling portion is provided with the first flat portion and the fitting projection, the second coupling portion is provided with the second flat portion and the fitting depression, and the fitting projection and the fitting depression are fixedly fitted in a state in which the first flat portion and the second flat portion are in contact with each other at a center of the through hole in the axial direction.

9. The liquid-sealed type vibration isolator according to claim 6, wherein the pair of partitioning plates are formed of resin material, respectively, and the first welding portion and the second welding portion are secured by means of ultrasonic welding.

\* \* \* \* \*

UNITED STATES PATENT AND TRADEMARK OFFICE
CERTIFICATE OF CORRECTION

PATENT NO. : 8,596,621 B2  
APPLICATION NO. : 13/120106  
DATED : December 3, 2013  
INVENTOR(S) : Ogasawara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 324 days.

Signed and Sealed this
Twenty-second Day of September, 2015

Michelle K. Lee
*Director of the United States Patent and Trademark Office*